May 8, 1934.   W. D. MOORE   1,958,011
PIPE PACKING
Filed Jan. 23, 1931   2 Sheets-Sheet 1

INVENTOR
Wm. D. Moore
BY
Meyers & Jones,
his ATTORNEY

May 8, 1934.  W. D. MOORE  1,958,011
PIPE PACKING
Filed Jan. 23, 1931   2 Sheets-Sheet 2

INVENTOR
Wm. D. Moore
BY
Meyers & Jones
his ATTORNEY

Patented May 8, 1934

1,958,011

UNITED STATES PATENT OFFICE 1,958,011

PIPE PACKING

William D. Moore, Birmingham, Ala., assignor to American Cast Iron Pipe Company, Birmingham, Ala., a corporation of Georgia Application January 23, 1931, Serial No. 510,785

4 Claims. (Cl. 285—115)

My invention relates to pipe packing of the general type disclosed in patent to A. J. Herrmann, No. 1,775,459, dated September 9, 1930.

The principal object is to improve co-operating ring packing elements of a character generally similar to those disclosed in the stated patent, in such manner that the rings will properly seal pipe joints in which the cooperating pipe members have considerable variations from normal or standard dimensions, or variations or inequalities in shape to such an extent that the rings disclosed in said patent will be ineffective to make or maintain a properly tight joint; the present improved ring structure is also effective to make a tight joint between pipe members which have normal or only slight size or shape variations, as in the case of the packing members of the patent referred to.

While not necessarily limited to such uses, the invention structure is especially designed as a packing for bell and spigot joints in pipe lines used for gas or other fluids.

The invention as physically embodied consists principally in cooperating packing rings of rubber or suitable rubber composition, of generally tapered or wedge section, one of the rings having at its edge or face initially directed toward the other ring, an enlarged bead, or head portion of substantially round section, and normally projecting outward from the outer face of the ring proper and acting in cooperation with the complemental ring of tapered section to completely fill the joint space between the spigot and bell pipe formations, when they are of either normal or abnormal dimensions or shapes.

The characteristics and advantages of the invention are further sufficiently explained in connection with the following detail description of the accompanying drawings, which shows representative embodiments. After considering these examples, skilled persons will understand that many variations may be made without departing from the principles disclosed and I contemplate the employment of any structures that are properly within the scope of the appended claims.

Figure 1:
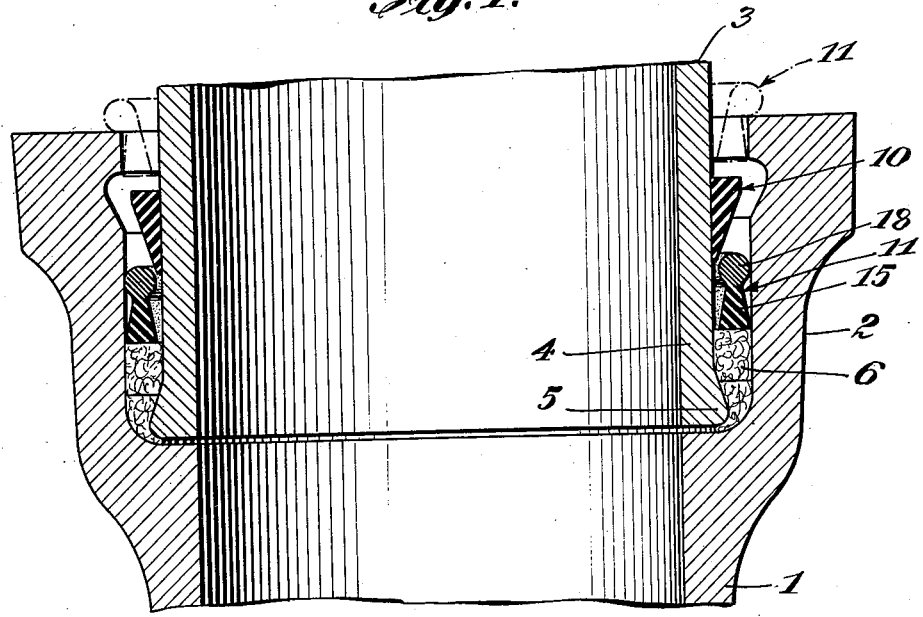
Fig. 1 is a longitudinal section of a bell-and-spigot pipe joint, embodying the invention, or the invention devices, in one form, in partly completed or partially-assembled condition.
Figure 2:
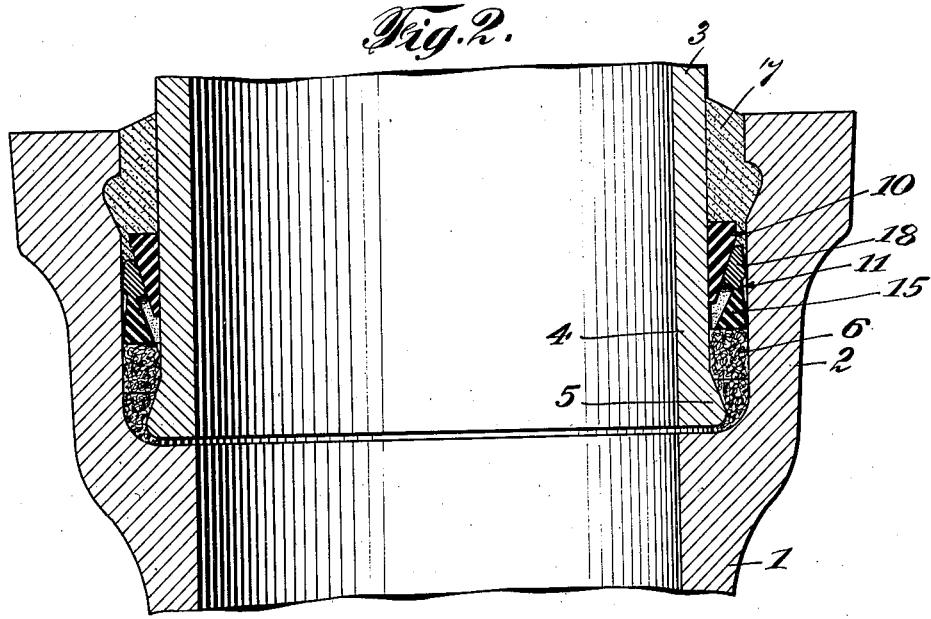
Fig. 2 shows the completed joint.

Figs. 1 and 2 show one typical form of pipe joint of bell-and-spigot type consisting of a pipe section 1 having a bell end 2 and a pipe section 3 having a spigot end 4 which may or may not have a terminal enlargement, flare or bead 5.

Any usual or suitable fibrous lead or other packing 6 is tamped into the bottom of the joint (at the bottom of the bell and adjacent the end of the spigot), and after the present packing rings are inserted, the joint is completed by insertion of any suitable outer packing 7, usually lead.

Figure 4:
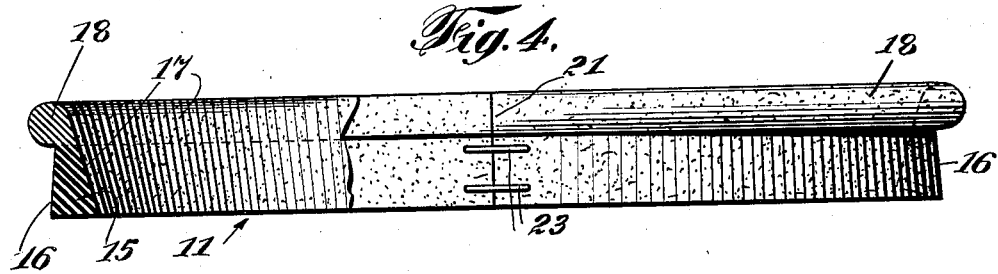
Fig. 4 is a combined side elevation and section of one of the improved packing rings.
Figure 5:
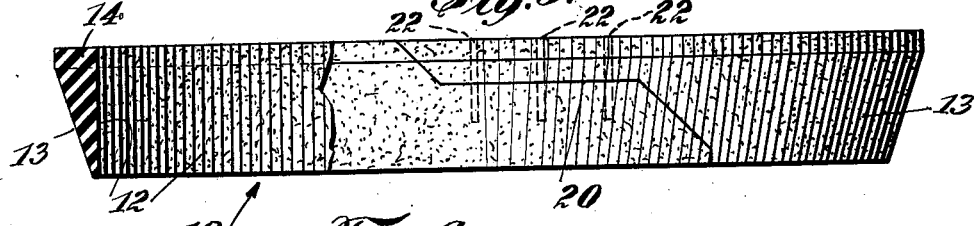
Fig. 5 is a similar view of the other co-operating ring.

The present improved cooperating packing elements or rings include an outer ring 10, shown separately in Fig. 5, and an inner ring 11, Fig. 4, the words "outer" and "inner" being used as convenient designations in view of the usual relative location of the rings as they are inserted into the joint. Either or both of the rings may be of continuous circular form, or may be divided or split at one side in any of various ways, as referred to later.

Both rings are of rubber or a suitable rubber composition, or equivalent material.

The outer ring 10 is of generally tapered or wedge section including an inner cylindrical wall 12, an outer conical wall 13 and an upper short cylindrical portion 14.

The inner ring 11 has a body or base portion 15 of generally tapered or wedge section including a substantially straight cylindrical outer wall or surface 16 and a conical inner wall or face 17; and at the outward end of this body portion is provided an enlarged annular head or "ball" portion 18 which may be of substantially circular section and is preferably so arranged that its center is substantially in line with the outer face 16 of the body portion.

Desirably, although not necessarily in all cases, the head or bell portion 18 is of softer or more compressible character than the body portion 15, and this may be accomplished by making the base and head portions separately and differently compounding the compositions, or by different vulcanizing treatments, after which the parts may be cemented or vulcanized together; otherwise the required "hardness" variations may be accomplished by controlling the vulcanizing operations, if the ring is in an integral piece.

The object of this feature is to provide a base portion which is relatively stiff to properly support the head portion while the outer ring is forced into position, and to make the head portion sufficiently resilient or compressible to properly form itself in relation to the outer ring and inner face of the pipe bell, as will appear.

Figs. 1 and 2 show a case in which the spigot and bell members are of normal shape and dimensions; that is, within ordinary limits of variations; and the spigot portion may therefore be properly located, concentrically within the bell, with equal clearance all around, and this clearance is of normal lateral extent.

After the inside or bottom packing 6 is properly placed as stated, the inner ring 11, which has previously been placed about the spigot portion 3, is pushed down into the bell portion, and as it enters the bell (as shown in dotted lines, in Fig. 1) the ball or head portion 18 projecting or overhanging outwardly against the end of the bell is forced inward, and rests against the inner surface of the bell when the ring is pushed down to seat the bottom of its base portion 15 on the inner packing 6. The ball or head portion 18 is then located substantially in alignment with the longitudinal center of the base portion.

The outer ring 10, which has also previously been placed about the spigot end of pipe 3, is then pushed inward and forced or tamped with suitable tools to engage within the head portion 18 and finally reaches a position about as shown in Fig. 2, wherein the head 18 has been deformed to elongated or ovate section, being fully compressed between the conical face of the outer ring and the inner wall of the pipe bell 2 to make and maintain a tight joint. The outer packing 7 is then inserted as usual to complete the joint.

Figure 3:
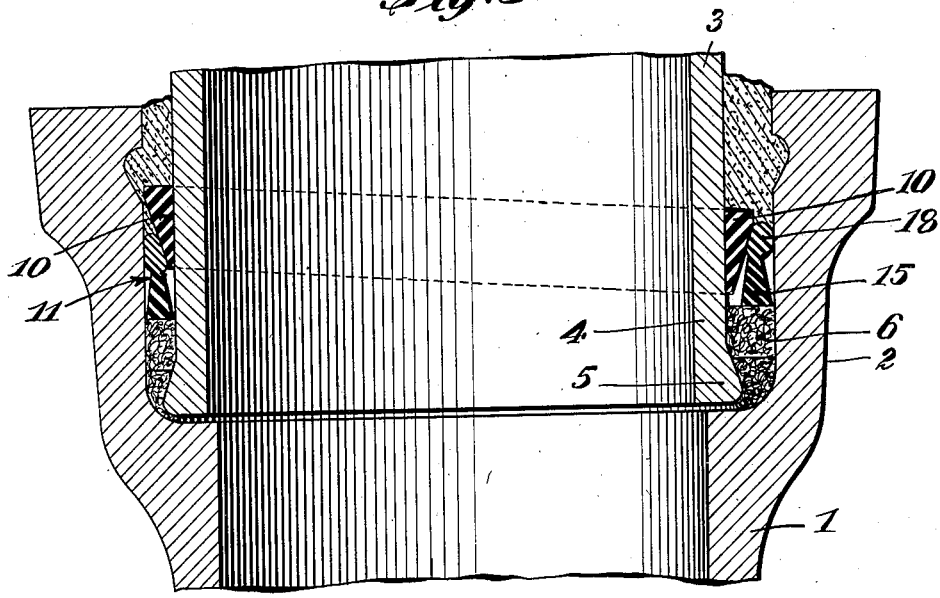
Fig. 3 is a longitudinal section of a complete joint, in which the pipe members are of abnormal dimensions or shapes, or are in abnormal relative positions.

Fig. 3 shows a case in which the bell or spigot pipe portion, or both, are of abnormal dimensions, beyond ordinary variation limits, or of more or less abnormal form, so that in a fairly extreme example, as shown for purposes of illustration, the spigot portion is somewhat eccentric to the bell portion and may also be axially more or less angularly located; also either or both members are of such shape of dimensions or in such positions that the lateral clearance space between the spigot and bell at one side is much wider than at the other. The present improved packing means take care of such conditions or variations in a manner well shown in this figure. The base portion 15 of the inner ring is of such lateral dimension that it will pass between the spigot end and the bell wall where they are closest together (at the left), and is seated on the inner packing 6 as before. When the outer ring 10 is driven home to the desired degree of tightness, it may as shown, assume a tilted or angular position; but at all points it deforms or compresses the head portion 18 of the inner ring to tightly and resiliently close the space between the spigot and bell at all points including the point or zone of greatest separation, at the right. In other cases the outer ring will not necessarily assume a tilted position, but in all cases may be tamped down to fully and properly compress the head member 18 and fill the joint.

Reference has been made above principally to original pipe line assembly, in which the spigot end of the pipe is accessible to place the rings thereon before insertion into the bell. In any case where the rings cannot readily be placed about the spigot, as in repairing joints after original assembly, the rings may be split at one point either with a diagonal or splice cut 20, as shown in Fig. 5, with reference to the outer ring 10, or with a straight cut 21, as shown in Fig. 4, with reference to the inner ring 11. After the respective rings are placed about the spigot portion of the pipe the ends may be cemented in any suitable way, as by rubber cement, or by pins or screws 22, Fig. 5, or staples 23, Fig. 4; and when the rings are properly forced or driven home the ring joints will be properly compressed.

Figure 6:
Fig. 6 shows a modification of the packing ring diclosed in Fig. 4.

Instead of the splice constructions above referred to, each of the rings may have a substantially V-shaped splice as shown in Fig. 6, to provide interlocking male and female portions. When thus constructed and the rings properly inserted in the bell, there is little or no opportunity for lateral separation of the spliced ends.

Instead of constructing the head or bell portion of the bottom ring of softer or more compressible rubber than that constituting its base, experiments have demonstrated that the best results are secured by constructing the entire bottom ring 15, of medium soft rubber, and the top ring or driving wedge 10, of relatively harder rubber or rubber composition, but which is still deformable to a degree, the idea being to provide two rings of the character described, one of them, namely, the one with the lateral head, being capable of deformation to a greater extent than the other. This arrangement provides an especially desirable construction for use primarily in repairing joints already in service, although they may of course be used in new pipe lines.

I claim:—

1. For use in a pipe joint of the character described cooperating packing rings of rubber and of generally wedge section, one of the rings having an enlarged head portion at its narrow end, the head portion being of relatively softer or more compressible character than the base portion.

2. For use in a pipe joint of the character described, a rubber packing ring including a base portion of polygonal section and a head portion of enlarged arcuate section at one end of said base portion and projecting laterally beyond a wall of the base portion.

3. For use in a pipe joint of the character described, a rubber packing ring including a polygonal base portion and a curved head portion of enlarged section on said base portion, the head portion being of relatively softer or more compressible character than the base portion.

4. A pipe joint comprising bell and spigot pipe members, and a packing between the members comprising a ring essentially of rubber having a substantially wedge-shaped base portion and an enlarged head portion at the narrow end of the base portion, and a cooperating substantially wedge-shaped ring the deformability characteristics of which are less than its companion ring.

WILLIAM D. MOORE.